United States Patent
Yue et al.

(10) Patent No.: US 10,148,329 B2
(45) Date of Patent: Dec. 4, 2018

(54) ADAPTIVELY GROUPED USER EQUIPMENT MULTICASTING AND BEAMFORMING

(71) Applicant: Futurewei Technologies, Inc., Plano, TX (US)

(72) Inventors: Guosen Yue, Edison, NJ (US); Xiao-Feng Qi, Westfield, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 203 days.

(21) Appl. No.: 15/158,625

(22) Filed: May 19, 2016

(65) Prior Publication Data

US 2017/0338873 A1 Nov. 23, 2017

(51) Int. Cl.
*H04B 7/06* (2006.01)
*H04B 17/336* (2015.01)
(Continued)

(52) U.S. Cl.
CPC ......... *H04B 7/0617* (2013.01); *H04B 7/0413* (2013.01); *H04B 17/336* (2015.01);
(Continued)

(58) Field of Classification Search
CPC .. H04B 17/336; H04B 7/0617; H04B 7/0413; H04B 7/02–7/0697; H04B 7/0452;
(Continued)

(56) References Cited

U.S. PATENT DOCUMENTS

2009/0015472 A1* 1/2009 Lozano ............... H04B 7/0617
342/367
2009/0303979 A1* 12/2009 Hottinen ............... H04L 5/0037
370/345
(Continued)

FOREIGN PATENT DOCUMENTS

CN 101674120 3/2010
CN 103199908 7/2013

OTHER PUBLICATIONS

B. Hu, C. Hua, F. Lin, C. Chen and X. Guan, "MUBFP: Multi-user beamforming and partitioning in downlink MIMO systems," 2015 IEEE/CIC International Conference on Communications in China (ICCC), Shenzhen, 2015, pp. 1-6 doi: 10.1109/ICCChina.2015. 7448636 http://ieeexplore.ieee.org/stamp/stamp.jsp?tp=&arnumber=744863.*

(Continued)

*Primary Examiner* — Mark H Rinehart
*Assistant Examiner* — Kenneth P Hunt
(74) *Attorney, Agent, or Firm* — James A. Harrison (57) ABSTRACT

A method for adaptive user equipment (UE) grouping and beamforming includes the assignment each of a plurality of user equipment (UE) devices into a respective UE group of a plurality of UE groups. Each UE group has at least one UE device. A UE device is reassigned from the respective UE group to which it was previously assigned to an updated UE group. An updated respective beamforming vector is generated for the updated UE group until the updated respective beamforming vector for each UE group produces a largest average UE rate for the updated UE group.

21 Claims, 9 Drawing Sheets

(51) Int. Cl.

| | | |
|---|---|---|
| *H04B 7/0413* | (2017.01) | |
| *H04L 12/26* | (2006.01) | |
| *H04W 16/18* | (2009.01) | |
| *H04W 16/28* | (2009.01) | |
| *H04W 72/04* | (2009.01) | |
| *H04W 72/08* | (2009.01) | |

(52) U.S. Cl.
CPC .......... *H04L 43/0894* (2013.01); *H04L 43/16* (2013.01); *H04W 16/18* (2013.01); *H04W 16/28* (2013.01); *H04W 72/042* (2013.01); *H04W 72/085* (2013.01)

(58) Field of Classification Search
CPC ...... H04B 7/0456; H04B 7/06; H04B 7/0613; H04B 7/0615; H04B 7/0619; H04B 7/0626; H04B 7/0632; H04W 72/042; H04W 16/28; H04W 16/18; H04W 72/085; H04L 43/16; H04L 43/0894
See application file for complete search history.

(56) References Cited

U.S. PATENT DOCUMENTS

| | | | | |
|---|---|---|---|---|
| 2012/0027106 | A1* | 2/2012 | Khojastepour | H04B 7/0617 375/259 |
| 2012/0027117 | A1 | 2/2012 | Khojastepour et al. | |
| 2012/0281531 | A1* | 11/2012 | Susitaival | H04W 48/06 370/230 |
| 2013/0171997 | A1* | 7/2013 | Zasowski | H04W 84/042 455/446 |
| 2015/0016379 | A1* | 1/2015 | Nam | H04B 7/0456 370/329 |
| 2016/0021550 | A1* | 1/2016 | Bhanage | H04W 16/28 370/312 |
| 2017/0063438 | A1* | 3/2017 | Baik | H04L 5/006 |
| 2017/0064566 | A1* | 3/2017 | Elsherif | H04W 16/28 |

OTHER PUBLICATIONS

Wkipedia, "Partition of a set," Jan. 1, 2018, https://en.wikipedia.org/wiki/Partition_of_a_set.*

B. Hu, C. Hua, F. Lin, C. Chen and X. Guan, "MUBFP: Multi-user beamforming and partitioning in downlink MIMO systems," 2015 IEEE/CIC International Conference on Communications in China (ICCC), Shenzhen, 2015, pp. 1-6 doi:10.1109/ICCChina.2015.7448636 http://ieeexplore.ieee.org/stamp/stamp.jsp?tp=&arnunnber=744863.*

H. Zhu, N. Prasad and S. Rangarajan, "Precoder design for physical layer multicasting," 2012 IEEE International Conference on Communications (ICC), Ottawa, ON, 2012, pp. 2140-2144. doi: 10.1109/ICC.2012.6364357 https://ieeexplore.ieee.org/stamp/stamp.jsp?arnumber=6252072.*

N. D. Sidiropoulos, T. N. Davidson and Zhi-Quan Luo, "Transmit beamforming for physical-layer multicasting," in IEEE Transactions on Signal Processing, vol. 54, No. 6, pp. 2239-2251, Jun. 2006. doi: 10.1109/TSP.2006.872578 https://ieeexplore.ieee.org/document/1634819/.*

"International Application No. PCT/CN2017/084922, International Search Report and Written Opinion dated Aug. 2, 2017", (dated Aug. 2, 2017), 11 pgs.

Lopez, Michael J., "Multiplexing, Scheduling, and Multicasting Strategies for Antenna Arrays in Wireless Networks", Cambridge, MA; Ph.D. dissertation, Dept. Eng. & Comp. Sci., MIT (2002), (Aug. 2002), 174 pgs.

Sidiropoulos, Nicholas D., et al., "Transmit Beamforming for Physical-Layer Multicasting", IEEE Transactions on Signal Processing, vol. 54, No. 6, Jun. 2006, (Jun. 2006), 2239-2251.

* cited by examiner

ADAPTIVELY GROUPED USER EQUIPMENT MULTICASTING AND BEAMFORMING

TECHNICAL FIELD

The present disclosure is related to adaptively grouping user equipment for purposes of multicasting and beamforming.

BACKGROUND

The Third Generation Partnership Project (3GPP) Long Term Evolution (LTE) radio interface supports both Frequency division duplex (FDD) and Time division duplex (TDD). A multiple input multiple output (MIMO) technique is an advanced antenna technique for a wireless device to improve spectral efficiency and thereby boost overall system capacity of 3GPP LTE systems. MIMO may be used for achieving diversity gain, spatial multiplexing gain and beamforming gain. Massive MIMO systems (i.e., 64+ antennas) are currently under investigation for 5G systems. However, even with the system capacity boost using MIMO, further capacity improvements may be necessary, especially in a multicasting scenario where the same content (e.g., video) is transmitted to groups of user equipment (UE) devices.

SUMMARY

A method for adaptive user equipment (UE) grouping and beamforming includes the assignment each of a plurality of user equipment (UE) devices into a respective UE group of a plurality of UE groups. Each UE group has at least one UE device. A UE device is reassigned from the respective UE group to which it was previously assigned to an updated UE group. An updated respective beamforming vector is generated for the updated UE group until the updated respective beamforming vector for each UE group produces a largest average UE rate for the updated UE group.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The various embodiments operate in wireless communication systems such as Institute of Electrical and Electronics Engineers (IEEE) 802.11 standards-based systems, $3^{rd}$ Generation Partnership Project (3GPP) long term evolution (LTE) based wireless systems, future $3^{rd}$ Generation Partnership Project (3GPP) 5G systems based wireless systems. For simplicity, subsequent descriptions refer to communications at the base station (e.g., evolved Node B (eNB)). However, other embodiments may be applied to communications at the UE as well.

Figure 1:
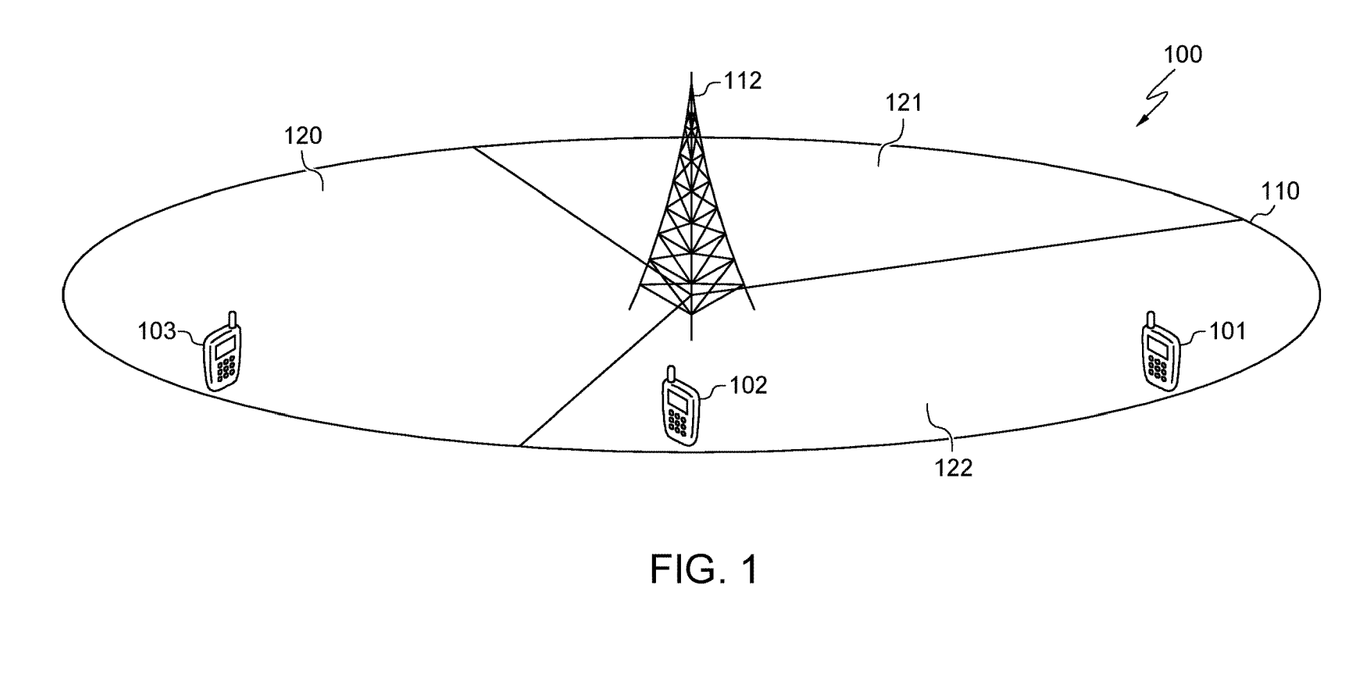
FIG. 1 is a diagram of a wireless communication system, in accordance with various embodiments.

FIG. 1 is a diagram illustrating a wireless communication system, in accordance with various embodiments. For example, the wireless communication system 100 may be a cellular system that enables one or more wireless communication devices 101-103 to communicate with one or more base stations 112 (e.g., evolved Node B (eNB), access point, transmission node, RRU, RRH, nodes in distributed antenna systems (DAS), donor node controlling relay, base transceiver station (BTS), multi-standard radio (MSR)) over one or more wireless channels using a wireless communication technique (e.g., mmWave, time division duplex (TDD), frequency division duplex (FDD)).

The wireless communication devices 101-103 may be non-stationary devices. For example, the wireless communication devices 101-103 may include mobile radiotelephones, tablet computers, lap top computers, and other devices that may communicate over a wireless channel with the base station 112. For consistency and simplicity, the wireless communication device 101-103 are subsequently referred to as user equipment (UE). The UE includes a transceiver and control circuitry coupled to a plurality of antenna elements through which beamforming may be accomplished.

The base station 112 may include a plurality of antennas coupled to a transceiver as well as control circuitry to control the base station operation. FIG. 1 and subsequent figures show only a single antenna for purposes of simplicity and clarity. However, a person having ordinary skill in the art would realize that for beamforming to be accomplished, the base station 112 comprises a plurality of antenna elements.

The base station 112 has a fixed location and may be part of a stationary base station network including other base stations that are coupled to a larger network. For example, the base station 112 may be part of a wired network that is coupled to the Internet. The UE 101-103 may then access the larger network by communicating over the wireless communication channels with the base station 112.

The base station 112 communicates over an area 110 substantially surrounding the base station antenna. This area 110 is typically referred to as a cell 110 and may comprise one or more sectors 120, 121, 122. While three different sectors 120, 121, 122 are shown making up the cell 110 of FIG. 1, other embodiments may comprise different sector quantities.

While a plurality of UEs 101-103 may be within the cell 110 generated by the base station 112, not all of the UEs 101-103 may be in contact with the base station 112. UE 101 that is registered with the base station or is attempting to register with the base station 112 may be defined as "a served UE". Other UEs 102-103 may be registered with other, neighboring base stations.

Figure 2:
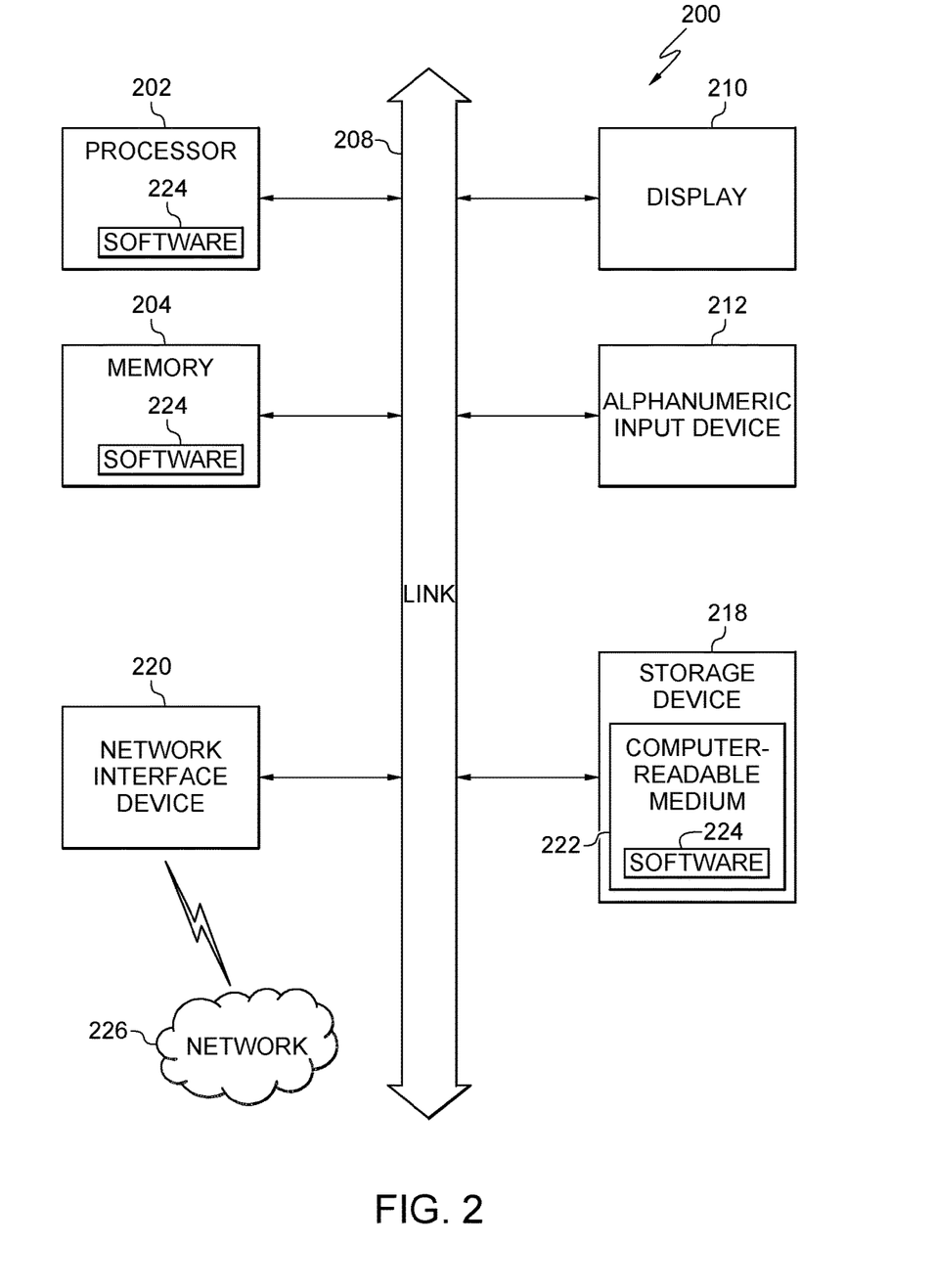
FIG. 2 is a block diagram of a wireless communication device, in accordance with various embodiments.

FIG. 2 is a block diagram of a wireless communication device 200, in accordance with various embodiments. The wireless communication device 200 may be in the example form of the UE (e.g., see FIG. 1), a cellular base station (e.g., eNodeB, eNB), an access point (AP), or some other wireless station. For example, the wireless communication device 200 may be a computer, a personal computer (PC), a tablet PC, a hybrid tablet, a personal digital assistant (PDA), or part of any device configured to execute instructions (sequential or otherwise) that specify actions to be taken by the wireless communication device 200.

The term "processor-based system" shall be taken to include any set of one or more communication apparatuses that are controlled by or operated by processing circuitry (e.g., a controller) to individually or jointly execute instructions to perform any one or more of the methodologies discussed herein. A set or sequence of instructions (e.g., operations) may be executed to cause the communication device to perform any one of the methodologies discussed herein, according to an example embodiment.

The wireless communication device 200 may include at least one controller 202 (e.g., a central processing unit (CPU), a graphics processing unit (GPU) or both, processor cores, compute nodes, etc.), and memory 204 that communicate with each other via a link 208 (e.g., bus). If the wireless communication device 200 is a UE, it may further include a display device 210 (e.g., video, LED, LCD) and an alphanumeric input device 212 (e.g., a keypad, keyboard). In one embodiment, the display device 210 and the input device 212 may be incorporated in one unit as a touch screen display.

The wireless communication device 200 may additionally include a mass storage device 216 (e.g., a drive unit, hard disk drive, solid state drive, optical drive) and a network interface device 220. The network interface device 220 may include one or more radios (e.g., transmitters and receivers (transceivers)) coupled to a plurality of antenna elements in order to communicate over a wireless network channel 226, as illustrated in FIG. 1. The one or more radios may be configured to operate using one or more communication techniques including the method for channel-state information determination disclosed herein. The network interface device 220 may also include a wired network interface (e.g., X2 backhaul link).

The storage device 216 includes a computer-readable medium 222 on which is stored one or more sets of data structures and instructions 224 (e.g., software) embodying or utilized by any one or more of the methodologies or functions described herein. The instructions 224 may also reside, completely or at least partially, within the memory 204 and/or within the controller 202 during execution thereof by the communication apparatus 200.

While the computer-readable medium 222 is illustrated in an example embodiment to be a single medium, the term "computer-readable medium" may include a single medium or multiple media (e.g., a centralized or distributed database, and/or associated caches and servers) that store the one or more instructions 224.

The increasing traffic demand for cellular systems is driven, at least in part, by video traffic. One of the video stream transmissions is the broadcast or multicast service in which, from communication point of view, the same information is transmitted to multiple receivers (e.g., UEs). MIMO, defined in LTE systems, can improve multicasting performance with precoding or beamforming. Such an approach may use physical layer multicasting by sending the same signal to all users in a network cluster. However, the channel for each user may be different and, thus, result in different levels of signal quality at the UE.

The present embodiments perform physical layer multicasting by grouping served UEs into several user groups. Then for the UEs in a particular group, the same or virtually the same information stream is precoded with the same precoding or beamforming vector and broadcast to the UEs in that particular group. The information and precoding are different among different groups.

Each UE grouping is based on the channel conditions of candidate UEs. Thus, the technique may be referred to as adaptive grouped physical layer multicasting. Additionally, the transmissions for different groups are on orthogonal channel resources. For example, the transmissions may be orthogonal in either time or frequency domain such as in orthogonal frequency-division multiplexing (OFDM) systems. This reduces interference among the signals between the different groups.

One of application for such adaptive physical layer multicasting is for the broadcast of control channel information. For example, in LTE systems, the resource allocation, modulation, and coding scheme (MCS) for the data transmissions are sent to the UEs via a control channel. Although such information is user specific and independently coded for each UE, the control information for multiple UEs are bundled together in the present embodiments and broadcast to the UEs using orthogonal resources. A UE may then perform blind detection to find desired control information for that particular UE.

The LTE standard provides for multiple pilot reference signal resources. Thus a group of the UEs may be assigned with an independent pilot reference signal to be used for channel estimations. The pilot reference signal can be precoded with the same precoding matrix as that used for broadcasting control data symbols. The number of pilot reference signal resources available for use may be used to determine the maximum number of UE groups for user separation. One of the examples is the enhanced physical layer control channel (ePDCCH) where there are four demodulation reference signal (DMRS) ports for ePDCCH for the normal cyclic prefix (CP) and two DMRS-ePDCCH ports for the extended cyclic prefix (CP).

At least two performance metrics are considered in the present embodiments. For example, the average throughput metric for the UE groups may be maximized. Additionally, the maximum-minimum fairness metric may also be maximized. In other words, the design of the UE groupings and beamforming is performed in order to maximize the minimum UE rate.

As used herein, the phrase UE rate may be defined as the UE download rate over the wireless channel that is supported by the UE's channel and beamforming vector for the group $$\left(\text{i.e., } R_k(g) = \log_2\left(1 + \frac{P\|h_k^H w_g\|^2}{\sigma_k^2}\right)\right).$$

This definition applies when the channel is being used for downloading content (e.g., video). Another definition of UE rate may include the signal-to-noise ratio (SNR) of the channel. This definition may apply when a control channel is being used since the control channel information is fixed but the transmission rate may be adaptively changed based on the channel conditions.

Also as used herein, maximizing the UE average rate or sum-rate may be defined as updating the user groups and the beamforming vector for each group until the average rate or sum-rate of the UEs in all groups is the largest possible for the current channels for all UEs. If the rate of a user is defined as the rate that is supported by the user's channel and beamforming vector for the group, i.e., $$R_k(g) = \log_2\left(1 + \frac{P\|h_k^H w_g\|^2}{\sigma_k^2}\right),$$

the sum rate of a group is then the summation of the rates of all users in the group, i.e., $$\sum_{k \in \mathcal{U}_g} R_k(g).$$

The sum rate, if not referenced for a particular group, is then the summation of the rates of all UEs in all groups.

Similarly, maximizing the minimum UE rate (e.g., max-min) may be defined as updating the UE rates in all groups by updating the user groups and the beamforming vector for each group until the smallest UE rate of all UEs in all groups reaches the largest for the particular channel conditions for all UEs.

Figure 3:
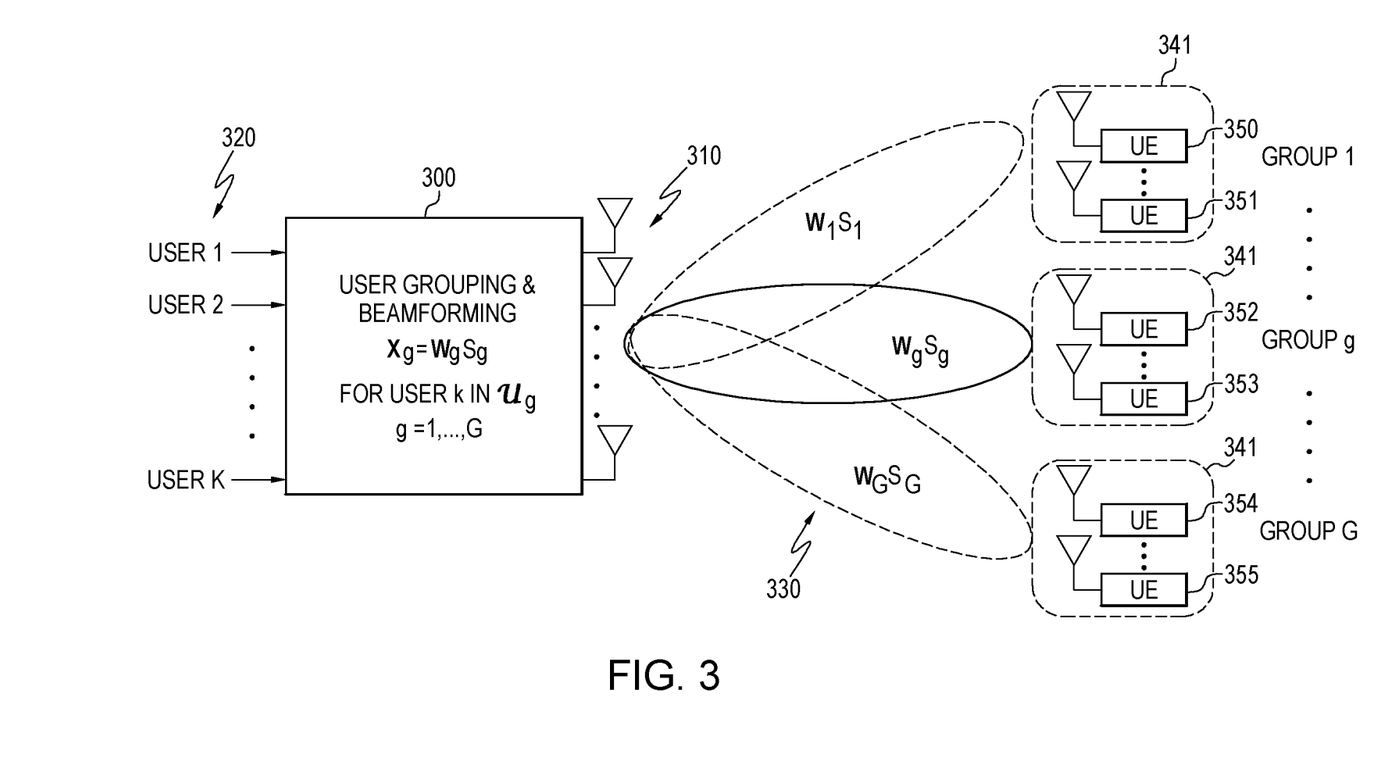
FIG. 3 is a block diagram of grouped multicasting and beamforming in a wireless communication system, in accordance with various embodiments.

FIG. 3 is a block diagram of grouped multicasting and beamforming in a wireless communication system, in accordance with various embodiments. This figure shows a plurality of user channels 320 being input to a user grouping and beamforming block 300 that is part of a base station. In the illustrated embodiment, the base station comprises a MIMO antenna system 310 with $M_T$ antennas and each UE 350-355 comprises a single antenna. Other embodiments may incorporate the MIMO antenna system in the UEs as well.

It is assumed that there are total K users 320 in the system as served by the base station. Assuming that user k is in the $g^{th}$ group, the group index for user k is denoted as $g_k$. The signal received at user k is then given by:

$$y_k = h_k^H x_{g_k} + n_k, \quad (1)$$

where $h_k$ having dimension $M_T \times 1$ is the channel matrix between the base station and the user k, $g_k$ is the group identity of the user k, $x_{g_k}$ of $M_T \times 1$ is the transmitted signal vector of the group $g_k$, $n_k$ is the additive complex white Gaussian noise with variance $\sigma_k^2$, and $(\cdot)^H$ denotes the matrix Hermitian. It is further assumed that the channel $h_k$ is the composite of small scaling fading and the received average power after large scale fading effects including pathloss and shadowing. The average received power for user k is denoted as $\alpha_k$. Substituting into Equation (1) produces:

$$h_k = \alpha_k \check{h}_k, \text{ and } E\{\check{h}_k \check{h}_k^H\} = R_k, \quad (2)$$

where $R_k$ is the transmit covariance matrix of the fading channel of user k.

For group g, the transmit signal with linear precoding is given as $$x_g = w_g s_g, \quad (3)$$

where $S_g$ is the information symbol that is to be delivered to all users in group g and $w_g$ of $M_T \times 1$ is the linear precoding vector for the $g^{th}$ group.

Since there is no interference among UE groups due to the orthogonal transmissions, the SNR of the UE in the $g^{th}$ group is then given as:

$$\gamma_k(g) = \frac{\|h_k^H w_g\|^2}{\sigma_k^2} \quad (4)$$

The rate of user k in the group g is then given by:

$$R_k(g) = \log_2(1 + \gamma_k(g)) = \log_2\left(1 + \frac{\|h_k^H w_g\|^2}{\sigma_k^2}\right). \quad (5)$$

It can be seen that, in order to achieve better multicasting performance for each UE group, when there is no restriction on which group a UE is assigned to or when the UE groups have not yet been determined, the design of the UE grouping is considered in order to improve the multicasting performance for each group. This shall be considered jointly with the design of transmit beamforming vectors for all user groups.

The assignment of UEs to groups for grouped physical layer multicasting is first considered to maximize the average UE rate or equivalently the sum UE rate (i.e., to find the optimal user grouping and beamforming for every group that maximize the average rate). The beamforming vector is subjected to the total power constraint (i.e., $\|w_g\|^2 \leq P$). It is assumed that the instantaneous channel state information (CSI) (e.g., rank information, precoding matrix index, channel quality indicator) is known at the base station. Given the number of groups, G, the joint assignment of user grouping and beamforming vectors can be represented as the following optimization problem given by:

$$\mathcal{P}1: \max_{\|w_g\|^2 \leq P, \{\mathcal{U}_g\}} \frac{1}{K} \sum_{g=1}^{G} \sum_{k \in \mathcal{U}_g} R_k(g). \quad (6)$$

A minimum rate constraint may also be added, such as:

$$R_k(g) \geq R_{min}. \quad (7)$$

In practice, it may be difficult to satisfy the minimum rate constraint for every UE when some of UEs are at or near a cell boundary. An alternative embodiment is that the minimum rate constraint is satisfied only when the UE is selected for service by the base station.

Equation (6) may be rewritten to have the normalized beamforming vector (i.e., $\|w_g\|^2=1$), given as:

$$\mathcal{P}1': \max_{\|w_g\|^2 \leq 1, \{\mathcal{U}_g\}} \frac{1}{K} \sum_{g=1}^{G} \sum_{k \in \mathcal{U}_g} R_k(g), \quad (8)$$

where $R_k(g)$ is given as:

$$R_k(g) = \log_2\left(1 + \frac{P}{\sigma_k^2}\|h_k^H w_g\|^2\right). \quad (9)$$

Commonly, $$\frac{P}{\sigma_k^2} \triangleq SNR_k$$

is the average SNR for user k before the beamforming.

In the assignment of UE grouping and beamforming design, an optimal solution of Equation (6) may be obtained. The optimal solution of the average-rate maximization for joint UE grouping and beamforming shall not have an empty user group when the number of users is equal or greater than number of groups (i.e., K≥G). This statement may be proven by the following contradiction.

Assume that there is an empty user group in the optimal solution. Then there exists a group, e.g., group g', having two or more users when K≥G. Assuming that the channels for any two UEs are not completely identical or completely linear dependent of each other then, for at least for one UE (e.g., user k'∈g'), the beamforming vector for this group does not maximize the user rate. We then move the user k' to the empty group g'' and form the beamforming matrix that maximizes the rate of user k', (i.e. the conjugate beamforming vector of the user k's channel given by $w_{g''}=h_{k'}/\|h_{k'}\|$). The rate of user k' increases, so does the sum-rate and average rate of all groups. Thus the solution with an empty user group is not the optimal solution for the average rate maximization. The problem of P1 in Equation (8) may be rewritten as:

$$\max_{\{\mathcal{U}_g\}} \frac{1}{K} \sum_{g=1}^{G} \left( \max_{\|w_g\|^2 \leq 1} \sum_{k \in \mathcal{U}_g} R_k(g) \right). \quad (10)$$

Figure 4:
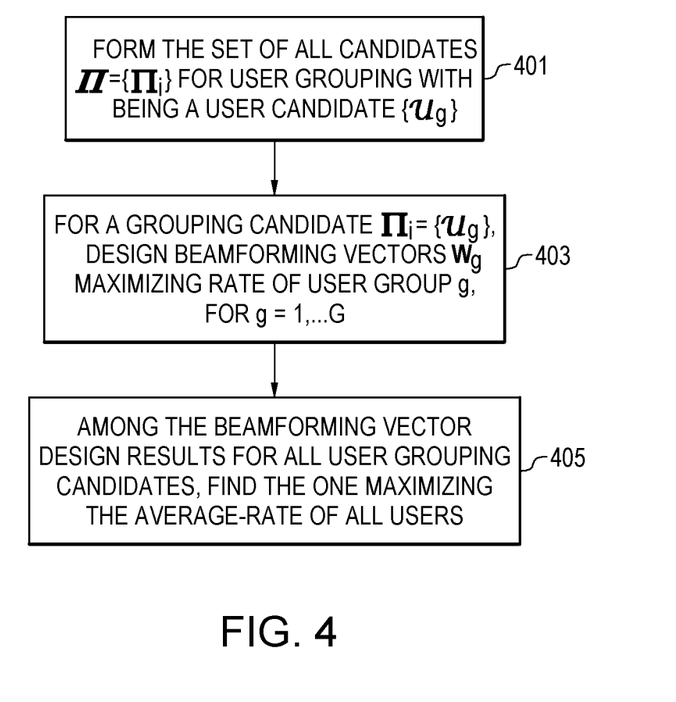
FIG. 4 is a flowchart for an exhaustive search of UE groupings for average-rate maximization, in accordance with various embodiments.

FIG. 4 is a flowchart for an exhaustive search of UE groupings for average-rate maximization, in accordance with various embodiments. From Equation (10), the optimization then becomes two parts. In block 401, a set of all candidate UE groups is set. This is denoted by $\Pi=\{\Pi_i\}$, with $\Pi_i$ being a UE group of candidate $\{\mathcal{U}_g\}$. In block 403, for a grouping of candidate $\Pi_i=\{\mathcal{U}_g\}$, the beamforming vectors $w_g$ may be designed for each group maximizing the sum-rate of the group g, for g=1, . . . G. Then for all possible UE group candidates, the UE group have the maximum average-rate. In block 405, the beamforming vector design results for all UE grouping candidates, the UE group that maximizes the average-rate for all of the UEs in the group is determined. The beamforming vector design for the group may be determined by solving the optimization: $\max_{\|w_g\|^2 \leq P} \sum_{k \in \mathcal{U}_g} R_k(g)$. The determined UE grouping and beamforming vector may then be used by the base station in communication with the UEs served by the base station.

Figure 5:
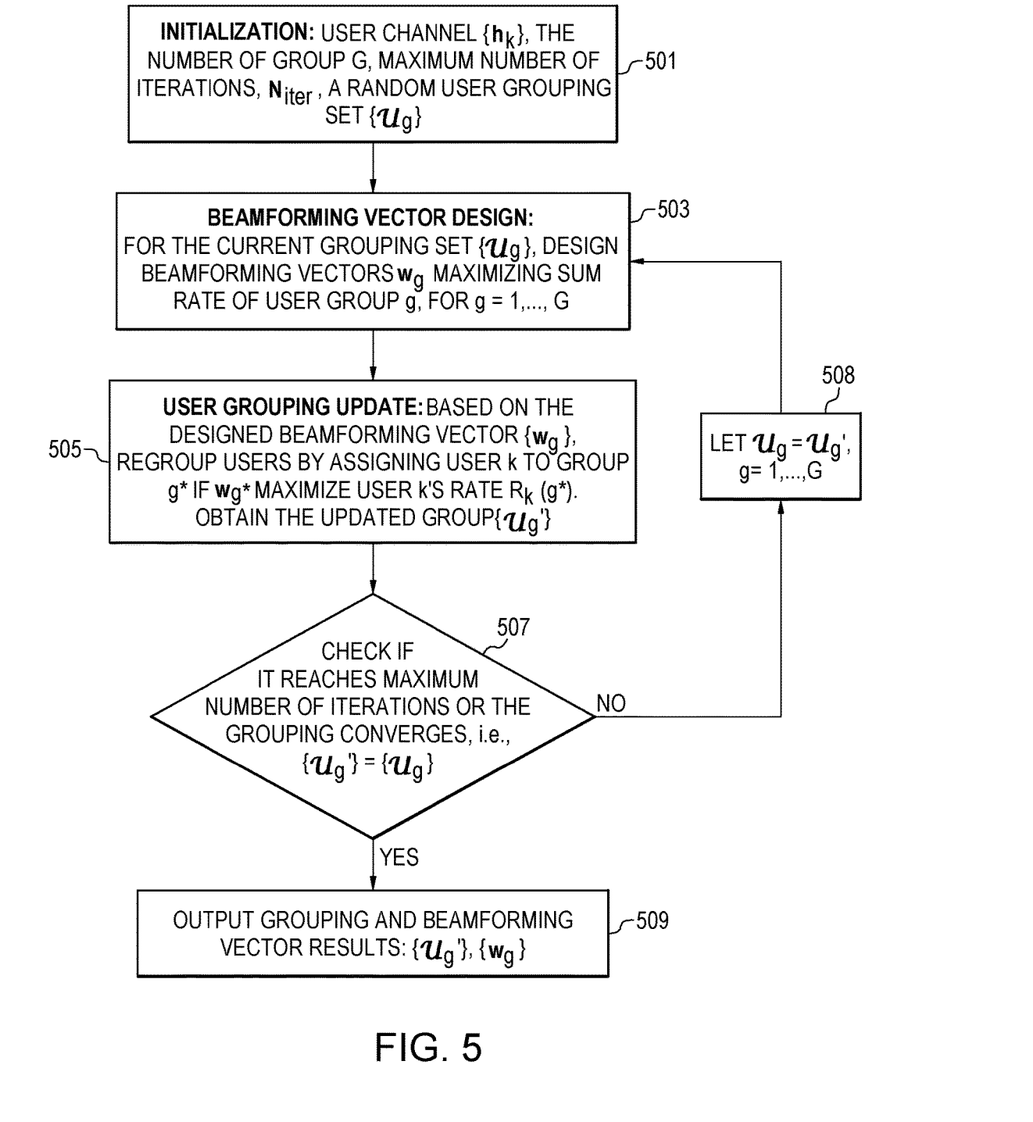
FIG. 5 is a flowchart of a method for iterative UE grouping and beamforming design for average-rate maximization, in accordance with various embodiments.

FIG. 5 is a flowchart of a method for iterative UE grouping and beamforming design for average-rate maximization, in accordance with various embodiments. The basic idea of the method is to form the UE grouping and the beamforming vector design in an iterative manner.

In block 501, UE channel information $\{h_k\}$, a number of groups G, a maximum number of iterations $N_{iter}$, and a random UE grouping $\{\mathcal{U}_g\}$ are all set during this initialization step. The maximum number of iterations may be determined by the total number of pilot signals available for that base station. In block 503, based on the given random UE grouping $\{\mathcal{U}_g\}$, the beamforming vectors $\{w_g\}$ are designed for the group g, g=1, . . . G that maximizes the sum rate for the UE group g. This is denoted by:

$$\max_{\|w_g\|^2 \leq 1} \sum_{k \in \mathcal{U}_g} R_k(g) = \max_{\|w_g\|^2 \leq 1} \sum_{k \in \mathcal{U}_g} \log_2\left(1 + \frac{P\|h_k^H w_g\|^2}{\sigma_k^2}\right). \quad (13)$$

In block 505, based on the beamforming design result $\{w_g\}$, the initial random UE groups or the latest updated UE groups from the previous iteration is updated by assigning user k to the group $g_k^*$ as:

$$g_k^* = \arg\max_g R_k(g) = \arg\max_g \log_2\left(1 + \frac{P\|h_k^H w_g\|^2}{\sigma_k^2}\right). \quad (14)$$

The updated UE group $\{\mathcal{U}'_g\}$ is generated from this.

In block 507, it is determined if the maximum number of iterations has been reached or the UE grouping converges (i.e., $\mathcal{U}'_g = \mathcal{U}_g$.) If neither of these are true, the method sets $\mathcal{U}_g = \mathcal{U}'_g$, g=1, . . . , G in block 508, and the method returns to step 503 and repeats until the maximum number of iterations is reached or the UE grouping converges (i.e., $\mathcal{U}'_g = \mathcal{U}_g$). In block 509, the determined UE grouping $\{\mathcal{U}'_g\}$ is used with the beamforming results $\{w_g\}$. Note that the UE grouping for the given beamforming vectors in block 505 is the optimal in this iteration. The determined UE grouping and beamforming vector may then be used by the base station in communication with the UEs served by the base station.

The beamforming design of block 503 of FIG. 5 may be accomplished in multiple ways. For example, a sum-SNR maximization method may be used or a gradient search method for the beamforming vector may be used.

In the sum-SNR maximization method, the design objective is changed. Instead of attempting to maximize the UE rate, an attempt is made to maximize a sum-SNR after the beamforming. This may be illustrated by:

$$\max_{\|w_g\|^2 \leq 1} \sum_{k \in \mathcal{U}_g} \frac{P}{\sigma_k^2}\|h_k^H w_g\|^2. \quad (15)$$

Although maximizing the post-beamforming sum-SNR is not the same to the average-rate or sum-rate maximization, the sum-rate is generally the same as using the solution of sum-SNR maximization. By absorbing $$\frac{P}{\sigma_k^2}$$

to the UE's channel, we have $$\tilde{h}_k = \sqrt{\frac{P}{\sigma_k^2}} h_k.$$

The objective then becomes:

$$\sum_{k \in \mathcal{U}_g} \frac{P}{\sigma_k^2} \|h_k^H w_g\|^2 = \sum_{k \in \mathcal{U}_g} \|\tilde{h}_k^H w_g\|^2 = \|\tilde{H}_g^H w_g\|^2. \quad (16)$$

where $\tilde{H}_g$ is formed by $\tilde{h}_k$ with user k in the $g^{th}$ group, i.e., $k \in \mathcal{U}_g$. The sum-SNR optimization then becomes:

$$\max_{\|w_g\|^2 \le 1} \|\tilde{H}_g^H w_g\|^2. \quad (17)$$

The above optimization can be solved by a singular value decomposition of $H_g$ given by:

$$\tilde{H}_g^H = \tilde{U}_g \tilde{\Sigma}_g \tilde{V}_g^H. \quad (18)$$

Assuming the descending order for the eigenvalues in $\tilde{\Sigma}_g$, the first one is the largest eigenvalue denoted as $\lambda_{max}$. The optimal beamforming vector is then obtained from the first column of $\tilde{V}_g = [v_{g,1}, v_{g,2}, \ldots v_{g,|\mathcal{U}_g|}]$, in other words:

$$w_g = \tilde{v}_{g,1}. \quad (19)$$

Figure 6:
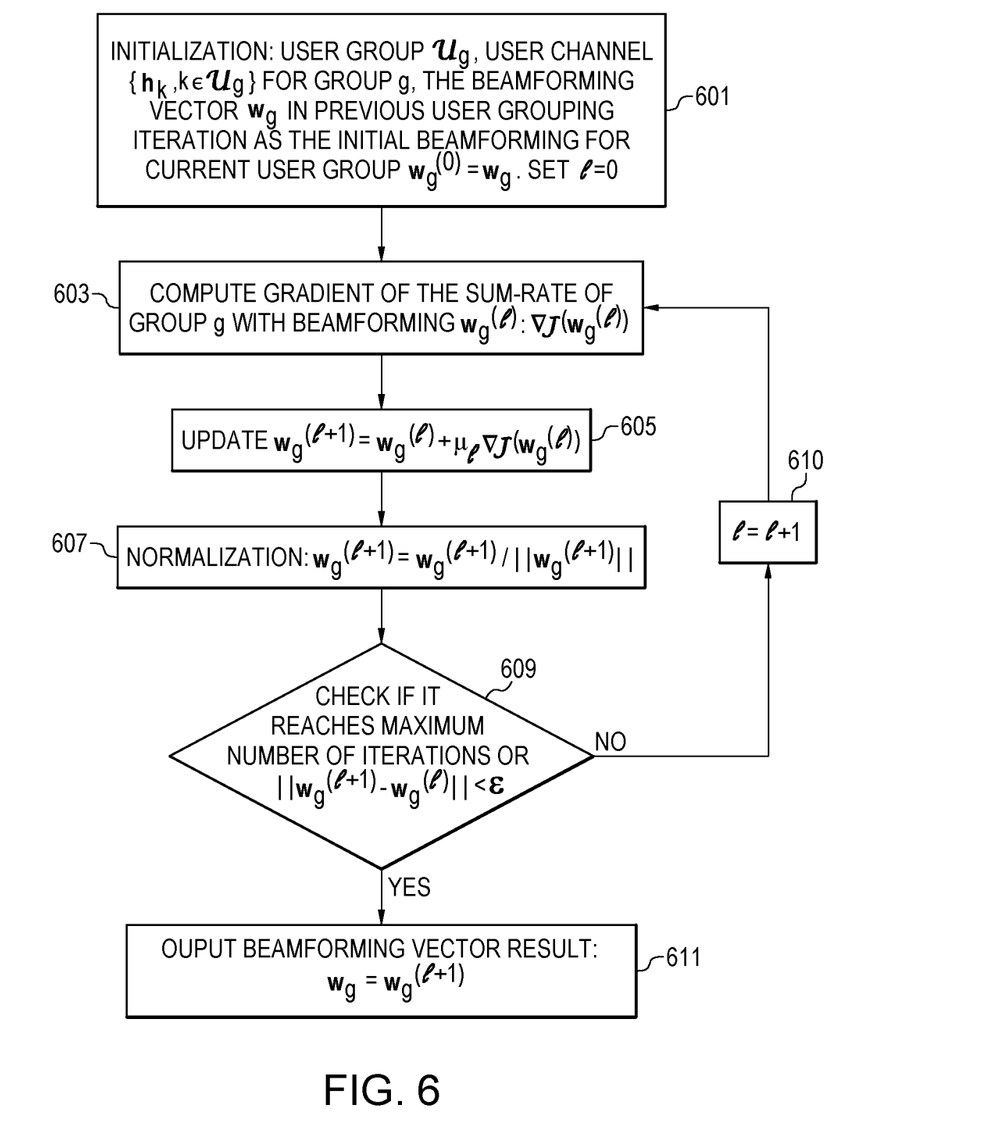
FIG. 6 is a flowchart of a method for a gradient search for beamforming design of a UE group with sum-rate maximization, in accordance with various embodiments.

FIG. 6 is a flowchart of a method for a gradient search for beamforming design of a UE group with sum-rate maximization, in accordance with various embodiments. In block 601, an initialization step is performed where the UE group $\mathcal{U}_g$, UE channel $\{h_k, k \in \mathcal{U}_g\}$ for group g, the beamforming vector $w_g$ from the previous UE grouping iteration are set as the initial beamforming vector design for the current UE group. Thus, $w_g^{(l)} = w_g$ where $l=0$.

Although it is possible to obtain a beamforming optimal solution using sum-SNR maximization, it is not optimal for the sum-rate maximization. Thus, a gradient approach for beamforming design may be used. The sum-rate objective is restated as:

$$J(w_g) = \sum_{k \in \mathcal{U}_g} \log_2 \left(1 + \frac{P\|h_k^H w_g\|^2}{\sigma_k^2}\right). \quad (20)$$

In block 603, the gradient J of the sum-rate of group g with beamforming vector $w_g^l$: $\nabla J(w_g^l)$ is determined by:

$$\nabla_{w_g} J(w_g) = \sum_{k \in \mathcal{U}_g} \left(1 + \frac{P\|h_k^H w_g\|^2}{\sigma_k^2}\right)^{-1} \log_2(e) \frac{P}{\sigma_k^2} h_k h_k^H w_g^*. \quad (21)$$

In block 605, the beamforming vector can then be obtained with the iterative gradient search as:

$$w_g^{(l+1)} = w_g^{(l)} + \mu_l \nabla_{w_g} J(w_g^{(l)}), \quad (22)$$

where $\mu_l$ is the step coefficient per iteration basis which can also be set as a constant $\mu$. In block 607, after the update of the beamforming vector $w_g$ in each iteration, the result is normalized to satisfy the unit power constraint by:

$$w_g^{(l+1)} = \frac{w_g^{(l+1)}}{\|w_g^{(l+1)}\|}. \quad (23)$$

In block 609, it is checked to determine if the maximum number of iterations has been reached or when $|w_g^{(l+1)} - w_g^{(l)}| < \varepsilon$, where $\varepsilon$ is a small positive value as the threshold. Note that such a method may be applied for every group g=1, ..., G in an iteration of user grouping. If neither of these tests are true, $l=l+1$ and the method returns to the step of computing the gradient of the sum-rate of group g for the next beamforming vector. If one of these tests are true, then block 611 sets the beamforming vector result as $w_g = w_g^{(l+1)}$. The determined UE grouping and beamforming vector may then be used by the base station in communication with the UEs served by the base station.

The iterative process for joint user grouping and beamforming design shown in FIG. 5 and described above may converge to the local optimum. This may be avoided by introducing a perturbation for each iteration of a UE grouping.

Figure 7:
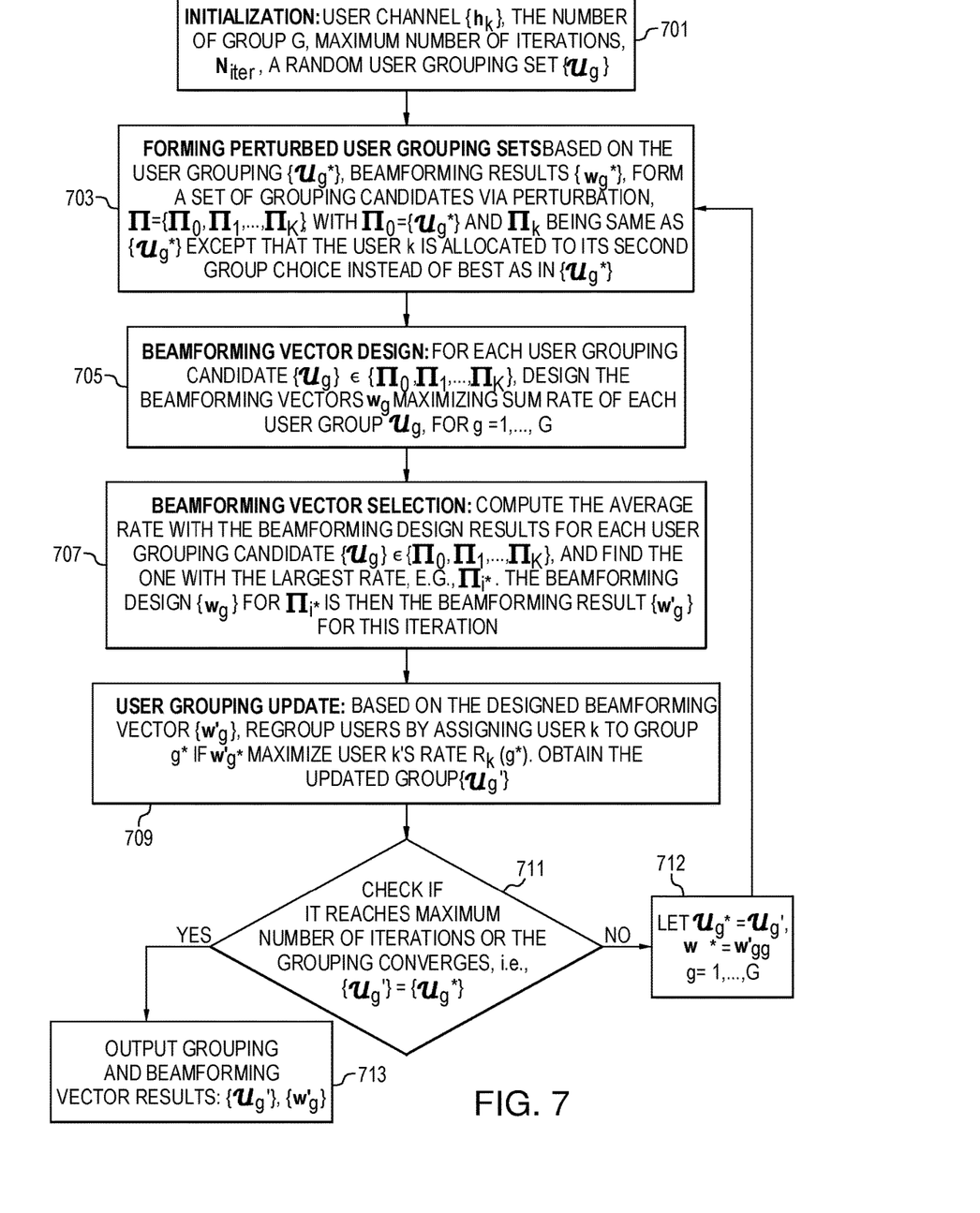
FIG. 7 is a flowchart of a method for iterative UE grouping and beamforming design for average-rate maximization with UE grouping perturbation, in accordance with various embodiments.

FIG. 7 is a flowchart of a method for iterative UE grouping and beamforming design for average-rate maximization with UE grouping perturbation, in accordance with various embodiments. In block 701, the method is initialized by setting a UE channel $\{h_k\}$, the number of groups G, the maximum number of iterations $N_{iter}$ (e.g., number of pilot signals), and a random UE grouping denoted $\mathcal{U}_g^c$ In block 703, based on the resulting UE grouping $\mathcal{U}_g^c$ and beamforming vectors results $\{w_g^*\}$ from the previous UE grouping iteration, the second best candidate group for each UE is determined. Then based on the UE grouping result from previous UE grouping iteration, we change only one UE's group and move it to its second best candidate group, which forms another UE grouping candidate (i.e., $\Pi = \{\Pi_0, \Pi_1, \ldots, \Pi_k\}$ with $\Pi_0 = \{\mathcal{U}_g^c\}$ and $\Pi_k$ being the same as $\{\mathcal{U}_g^c\}$ except that the UE k is allocated to its second choice instead of the best choice as in $\{\mathcal{U}_g^c\}$. Such a grouping output may be referred to as the perturbation of the best grouping with the given beamforming vectors from the previous iteration, $\{\mathcal{U}_g^c\}, \{w_g^*\}$. The UE's group is denoted as $g_k^*$, i.e., $g_k^* = g$ if $k \in \mathcal{U}_g^c$. If we have K users, a total K perturbed UE grouping candidates may be formed. Including the original one from previous iteration, we then have K+1 UE grouping candidates.

Block 703 may further be illustrated by first letting $\Pi = \{\mathcal{U}_g^c\}$, the user grouping result from previous iteration. For user k=1, ..., K, the second best candidate group may be found by:

$$g'_k = \arg\max_{g \ne g^*_k} \log_2\left(1 + \frac{P\|h_k^H w_g\|^2}{\sigma_k^2}\right). \qquad (24)$$

The perturbed UE grouping may be formed as $\Pi_k$, $k=1,\ldots,K$ where the UE group $\mathcal{U}_g = \mathcal{U}_g^*$, $g=1,\ldots,G$. The UE groups $U_{g^*_k}$ and $\mathcal{U}_{g'_k}$ are updated as $\mathcal{U}_{g^*_k} = \mathcal{U}_{g^*_k} \backslash \{k\}$ and $\mathcal{U}_{g'_k} = \mathcal{U}_{g'_k} \cup \{k\}$, respectively, where '\' denotes set exclusion and $\cup$ denotes set union.

With the candidate group set as $\Pi=\{\Pi_0, \Pi_1, \ldots, \Pi_K\}$, the first iteration can either form the set of K+1 random UE groupings or just one UE group, i.e., $\Pi = \{\Pi_0\}$.

In block 705, for $i=1,\ldots,|\Pi|$, where $|\cdot|$ denotes set cardinality, first let $\{\mathcal{U}_g\} = \Pi_i$, i.e., a UE grouping output, then based on such given grouping output $\{\mathcal{U}_g\}$, we design the beamforming vectors $w_g$ for each UE grouping candidate $\{\mathcal{U}_g\}$, $g$, $g=1,\ldots,G$, i.e., find $w_g$ for:

$$\max_{\|w_g\|^2 \le 1} \sum_{k \in \mathcal{U}_g} R_k(g) = \max_{\|w_g\|^2 \le 1} \sum_{k \in \mathcal{U}_g} \log_2\left(1 + \frac{P\|h_k^H w_g\|^2}{\sigma_k^2}\right). \qquad (25)$$

In block 707, $|\Pi|$ beamforming vector design results have been determined for corresponding $|\Pi|$ user grouping candidates. We then obtain the average UE rate, $\overline{R}_i, \ldots, \overline{R}_{|\Pi|}$ for each beamforming design result and UE grouping result. We find the one with the largest average rate and the corresponding beamforming vector is then the design results in this iteration denoted by $\{w'_g\}$.

In block 709, based on the best design result $\{w'_g\}$, the UE group is updated by assigning user k to the group $g_k^*$ as, $$g_k^* = \arg\max_g R_k(g) = \arg\max_g \log_2\left(1 + \frac{P\Pi h_k^H w'_g \Pi^2}{\sigma_k^2}\right) \qquad (26)$$

This results in the updated group $\{\mathcal{U}_g'\}$. This UE grouping is output for this other iterations.

In block 711, it is checked to determine if the maximum number of iterations has been reached or the grouping converges (i.e., $\{\mathcal{U}_g'\} = \{\mathcal{U}_g^*\}$. If either test is true, in block 712 $\mathcal{U}_g^* = \mathcal{U}_g'$ and $w_g^* = w'_g$, $g=1,\ldots,G$, and the method returns to block 703 until the maximum number of iterations is reached or the user grouping converges, i.e., $\mathcal{U}_g = \mathcal{U}_g^*$, $\forall g$. Otherwise, in block 713, the output grouping and beamforming vector results are lip, $\{\mathcal{U}_g'\}$, $\{w_g'\}$. The determined UE grouping and beamforming vector may then be used by the base station in communication with the UEs served by the base station.

For the beamforming vector design for each candidate user grouping in block 707 above, we can use either sum-SNR maximization or gradient search approach as mentioned previously. It should be noted that although in block 703 above we form K perturbed user grouping sets, we can actually form any arbitrary number of perturbed user grouping candidates. For example, to form fewer user grouping candidates, the perturbed user k can be selected based on the ascending order of UE rate according the UE grouping and beamforming results from previous iteration, i.e., the smaller rate, the higher priority. If it is desired to form more perturbed UE grouping candidates, we can either form the perturbed UE grouping candidate with any two or more UE's second group choice, or we can find its third, forth, and more group selections and form the perturbed UE grouping candidate via one UE's third or higher order group selection.

An alternative beamforming design may be accomplished using a maximum-minimum fairness technique. In this scenario, the grouped physical layer multicasting are designed to maximize the minimum rate over all UEs (i.e., find the optimal UE grouping and beamforming for every group that maximizes the minimum user rate). Given the number of UE groups, G, the joint design of UE grouping and beamforming vectors for max-min fairness can be represented as the following optimization problem $$P2: \max_{P w_g P^2 \le 1, \{\mathcal{U}_g\}} \min_k R_k(g). \qquad (27)$$

The minimum rate $\min_k R_k(g)$ is the minimum user rate over all groups. Since the user rate $$R_k(g) = \log_2\left(1 + \frac{P}{\sigma_k^2} \|h_k^H w_g\|^2\right),$$

the max-min user rate optimization is equivalent to the maximizing the minimum received SNR over all users, given by $$P2': \max_{\Pi w_g \Pi^2 \le 1, \{\mathcal{U}_g\}} \min_k \frac{P}{\sigma_k^2} \|h_k^H w_g\|^2. \qquad (28)$$

Note that the constant P can be dropped from the objective function. Similarly, a minimum rate constraint may be added to the above optimization as in Equation (7).

From the above discussion, the optimal solution for average rate maximization shall not have an empty group. However, this does not hold for the max-min fairness optimization. For example, for the UE with the lowest rate, the beamforming vector for the group that the UE belongs to is exactly the one that maximizes the UE's rate (i.e., the conjugate beamforming vector of the UE's channel, $h_k/\|h_k\|$). Instead, the following statement for the optimal solution of Equations (27) or (28) holds true: The optimal solution of max-min fairness for joint UE grouping and beamforming exists among the UE grouping without any empty UE group when the number of UEs is equal or greater than number of groups (i.e., K≥G).

This statement may be proven as follows: the claim is different from the above discussion. Here the optimal solution is not unique which can be found from the UE grouping without any empty groups, although it is not necessarily the grouping without any empty user groups. Assume that there is an empty UE group in the optimal solution. Assign k* as the UE with the minimum rate and the corresponding group is $g_{k^*}$. Now there are two scenarios.

In the first scenario, the optimized beamforming vector for the group $w_{g_{k^*}}$ where k* is does not maximize the rate for any user in the group $g_{k^*}$ including user k*. Since there is an empty user group, e.g., group g', we then move user k* to the empty group and form a one-user group. For the group g', we then form the beamforming matrix that maximizes the rate of user k*, i.e., the conjugate beamforming vector of the user k*'s channel given by $w_{g'}=h_{k*}/\|h_{k*}\|$. The rate of user k* then increases, so does the minimum user rate. Thus the optimum solution for such case always have no empty user group.

In the second scenario, the optimized beamforming vector for the group maximizes the user k* rate, i.e., $w_{g*}=h_{k*}/\|h_{k*}\|$. If that is the case, we can also move user k* to the empty group g' and form a one-UE group. With this, the minimum UE rate (i.e., smallest UE rate among all UEs) remains the same, indicating the newly formed grouping solution without any empty user group is also the optimal user grouping solution.

Since there are only these two scenarios, it may be concluded that the optimal solution exists among the user grouping candidates without any empty UE group. Thus, the problem of P2 in Equation (27) may be rewritten as:

$$\max_{\{U_g\}} \max_{\|w_g\|^2 \le 1} \min_k R_k(g). \qquad (29)$$

Then similar as in the embodiment of FIG. 4, an exhaustive search may be performed among all non-empty UE grouping candidates and design the beamforming vector for every group of every user grouping candidates, then eventually find the UE group with maximum minimum user rate, wherein each respective UE group comprises a different group of UE devices for each iteration. However, as discussed before, the number of grouping candidates increase exponentially with the number of UEs and the number of groups. The iterative approaches for user grouping and beamforming design are considered next.

Figure 8:
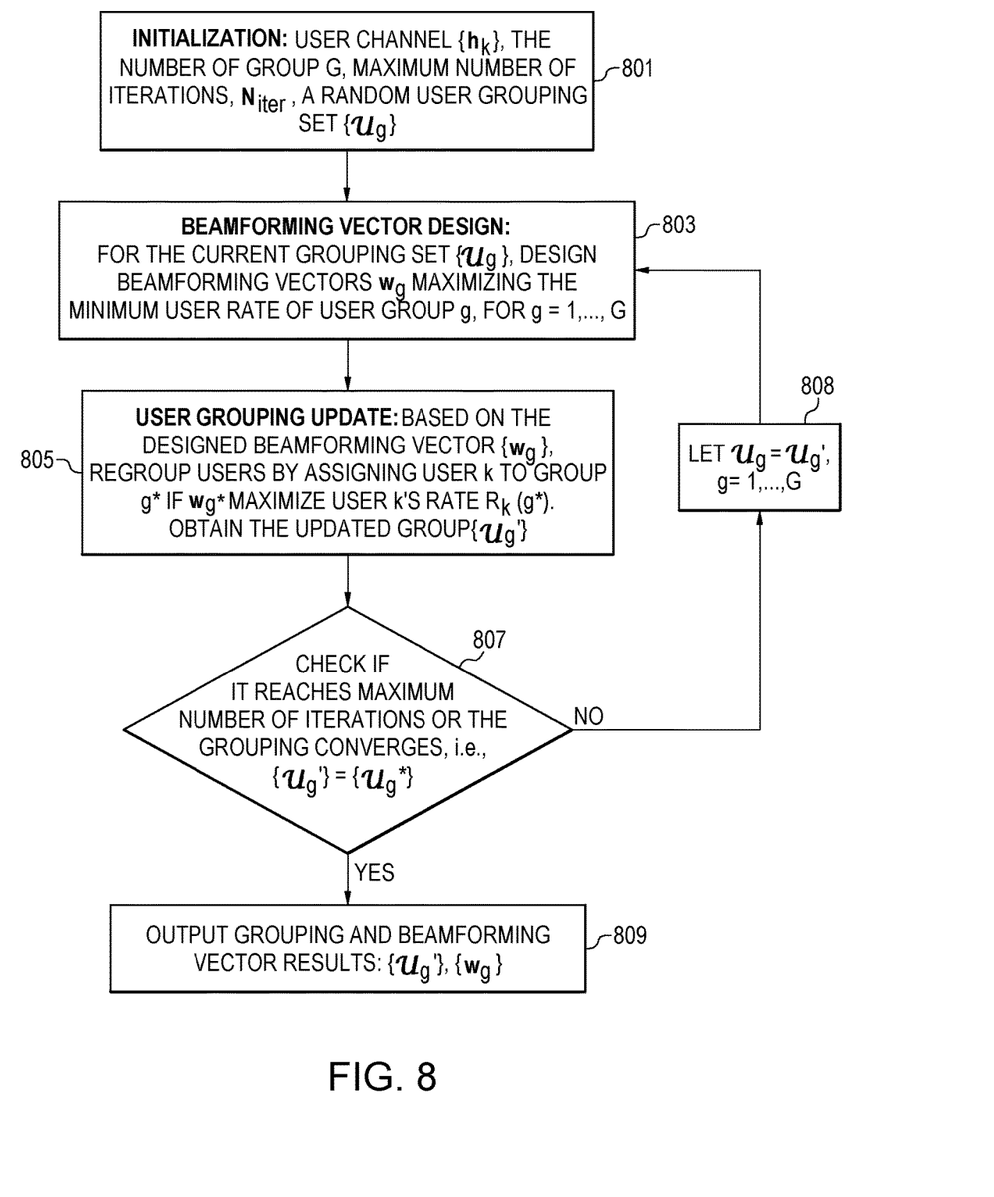
FIG. 8 is a flowchart of a method for an iterative UE grouping and beamforming design using maximum-minimum fairness, in accordance with various embodiments.

FIG. 8 is a flowchart of a method for an iterative UE grouping and beamforming design using maximum-minimum fairness, in accordance with various embodiments. In this embodiment, the iterative method of FIG. 5 may be used in an iterative user grouping and beamforming design embodiment for maximum-minimum fairness. The basic procedure is similar to the method of FIG. 5 but instead of using the sum rate of the UE grouping, the minimum UE rate is chosen (see blocks 503 and 803). Thus, the description of blocks 801, 805, 807-809 correspond to blocks 501, 505, 507-509 of FIG. 5 as described previously.

However, in block 803, each iteration is based on the user grouping results from previous iteration and the beamforming vector maximizes the minimum user rate of each UE group. Then the UE is regrouped based on the designed beamforming vectors for all groups (i.e., allocate the UE to the group resulting in its largest rate with the beamforming vector of the group). Based on the given grouping set $\{U_g\}$, the beamforming vectors $w_g$ for group g, g=1, ..., G are designed, i.e., find $w_g$ for:

$$\max_{\|w_g\|^2 \le 1} \min_{k \in U_g} \log_2\left(1 + \frac{P\|h_k^H w_g\|^2}{\sigma_k^2}\right). \qquad (30)$$

The problem of maximizing the minimum rate in block 803 is then solved for the multicasting in a group. It is known in the present art that the problem of multicasting beamforming for max-min fairness is NP-hard. By relaxation of the rank constraint, the problem is then converted to the linear optimization with equality and positive semidefinite constraints and thus can be solved optimally. However, the conventional algorithm used for the solution in the present art involves specific optimization numerical solver tools and the complexity may be high. We now consider a low complexity approach based on the gradient search.

From Equation (30), the objective function for multicasting beamforming with max-min fairness can be defined as $$M(w_g) = \min_{k \in U_g} \log_2\left(1 + \frac{P\|h_k^H w_g\|^2}{\sigma_k^2}\right). \qquad (31)$$

The solution maximize $M(w_g)$ is then found with the constraint $\|w_g\|=1$. Since $M(w_g)$ in Equation (31) is not differentiable, the derivative of $M(w_g)$ may not be obtained as that for the average rate or sum-rate $J(w_g)$ described previously. The derivative for each UE may then be obtained by:

$$\nabla_{w_g} R_k(w_g, g) = \qquad (32)$$

$$\nabla_{w_g} \log_2\left(1 + \frac{P\|h_k^H w_g\|^2}{\sigma_k^2}\right) = \left(1 + \frac{P\|h_k^H w_g\|^2}{\sigma_k^2}\right)^{-1} \log_2(e) \frac{P}{\sigma_k^2} h_k h_k^H w_g.$$

Then the iterative gradient search is performed as follows. First based on the beamforming vector obtained in previous iteration, e.g., $w_g^l$ in the l-th iteration, we find the user with the minimum rate, i.e., $$k_g^* = \arg\min_{k \in U_g} R_k(w_g^{(l)}, g) = \arg\min_{k \in U_g} \log_2\left(1 + \frac{P\|h_k^H w_g^{(l)}\|^2}{\sigma_k^2}\right). \qquad (33)$$

The gradient for the beamforming vector may be computed based on the rate of $k_g^*$, $\nabla_{w_g} R_{k_g^*}(w_g^{(l)},g)$, according to Equation (32). The update multicasting beamforming vector is the same as in Equation (22). After the update of $w_g$ in each iteration, the normalization is then performed as in Equation (23). Similarly, the iteration can be terminated by setting a maximum number of iteration or when $|w_g^{(l+1)} - w_g^{(l)}|<\epsilon$. The gradient search procedures are summarized in the flow chart shown in FIG. 9. Note that the gradient may also be computed based on the equivalent objective in Equation (28).

Figure 9:
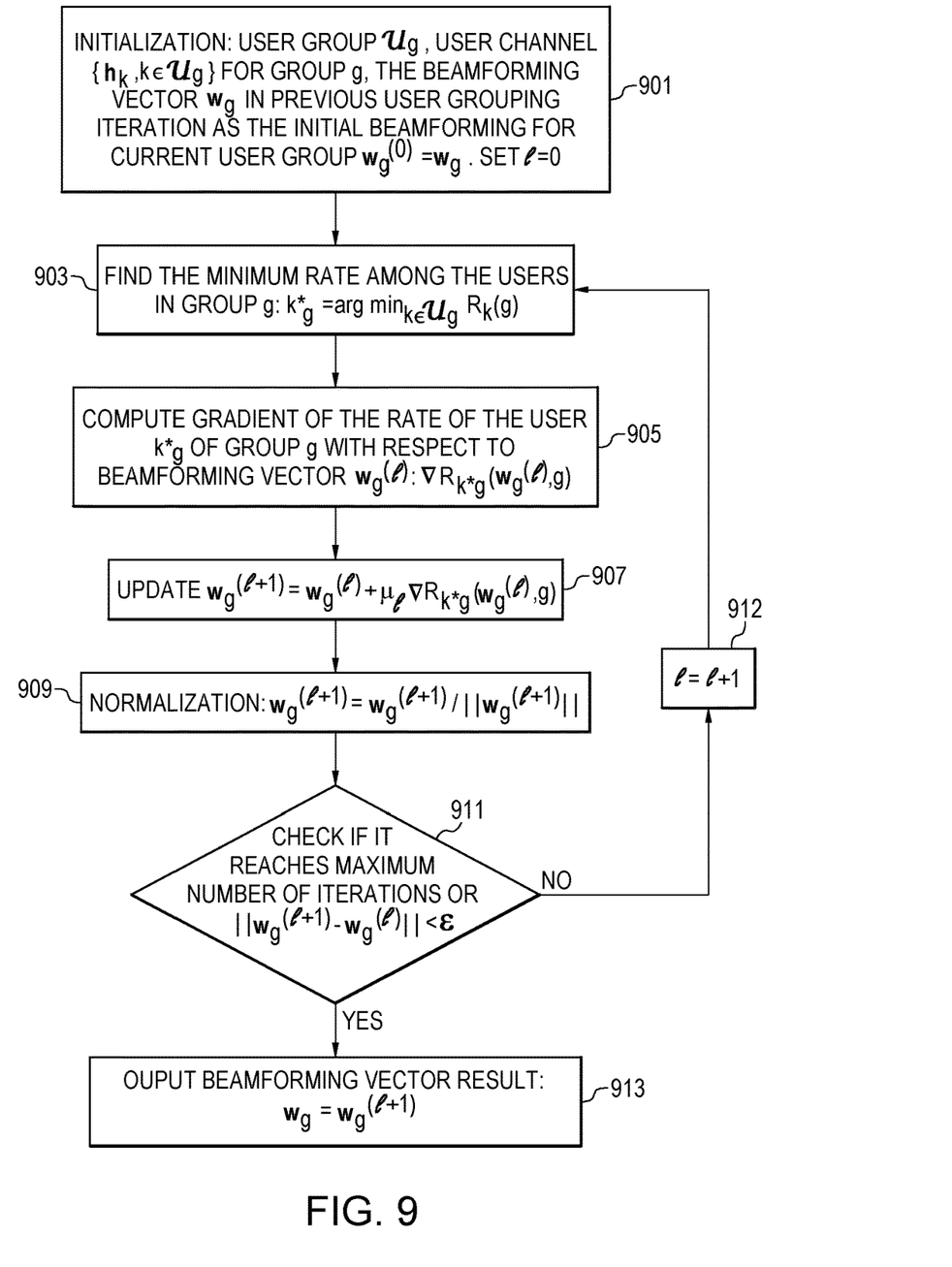
FIG. 9 is a flowchart of a method for gradient searching for beamforming design of a UE group with maximum-minimum fairness, in accordance with various embodiments.

FIG. 9 is a flowchart of a method for gradient searching for beamforming design of a UE group with maximum-minimum fairness, in accordance with various embodiments. In block 901, the method is initialized by assigning the UE group $U_g$, UE channel $\{h_k, k \in U_g\}$ for group g. The beamforming vector $w_g$ is the previous UE grouping iteration is set as the initial beamforming vector for the current UE group $w_g^0 = w_g$ and l=0.

In block 903, the minimum UE rate among the UEs is determined in group g: $k_g^* = \arg\min_{k \in U_g} R_k(g)$. In block 905, the gradient of the rate of the UE $k_g^*$ of group g is determined with respect to beamforming vector $w_g^l : \nabla R_{k^*g}(w_g^l, g)$. In block 907, the beamforming vector is updated: $w_g^{(l+1)} = w_g^{(l)} + \mu_l \nabla R_{k^*g}(w_g^{(l)},g)$. In block 909, the beamforming vector is normalized: $w_g^{(l+1)} = w_g^{(l+1)}/\|w_g^{(l+1)}\|$. In block 911, it is determined if the beamforming vector design iterations have reached the maximum number of iterations or $\|w_g^{(l+1)} - w_g^{(l)}\|<\epsilon$. If neither is true, then in block 912, the iterations are incremented (l=l+1) and the method repeated from block 903. Otherwise, the output of the method is the beamforming vector result of $w_g=w_g^{(l+1)}$ as seen in block 913. The determined UE grouping and beamforming vector may then be used by the base station in communication with the UEs served by the base station.

The perturbation for UE grouping can improve the iterative grouping and beamforming design performance similar to the embodiment illustrated in FIG. 7. Thus, the iterative design approach may be extended to the perturbed UE, as discussed previously with reference to FIG. 7, for iterative grouped multicasting design for max-min fairness. The procedures are the same as specified in blocks 701, 703, 705, 707, 709, 711-713 of FIG. 7, except for a change in block 705. In block 705, instead of the beamforming design for each group of each perturbed grouping candidate for maximizing the sum-rate of the group, we now design the beamforming vector for max-min fairness, i.e., for i=1, ..., |Π|, where |•| denotes set cardinality. First let $\{\mathcal{U}_g\}=\Pi_i$, i.e., a user grouping output, then based on such given grouping output $\{\mathcal{U}_g\}$, we design the beamforming vectors $w_g$ for group g, g=1, ..., G, i.e., find $w_g$ for max-min fairness as $$\max_{\Pi w_g \Pi^2 \leq 1} \min_{k \in \mathcal{U}_g} R_k(g) = \max_{\Pi w_g \Pi^2 \leq 1} \min_{k \in \mathcal{U}_g} \log_2\left(1 + \frac{P\|h_k^H w_g\|^2}{\sigma_k^2}\right). \quad (34)$$

The beamforming design in Equation (34) for each group of each UE grouping candidate can be obtained from gradient search as described previously with the embodiment of FIG. 9.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a computer. For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a computer. For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

The Abstract is provided with the understanding that it will not be used to limit or interpret the scope or meaning of the claims. The following claims are hereby incorporated into the detailed description, with each claim standing on its own as a separate embodiment.

What is claimed is:

1. A method for adaptive user equipment (UE) grouping and beamforming comprising:
   assigning each of a plurality of user equipment (UE) devices into a respective UE group of a plurality of UE groups, each UE group comprising at least one UE device; and
   reassigning a UE device from the respective UE group to an updated UE group comprising at least two UE devices and generating an updated respective beamforming vector for the at least two UE devices of the updated UE group until the updated respective beamforming vector for the at least two UE devices of each updated UE group produces a largest average UE rate or a largest minimum UE rate.

2. The method of claim 1, wherein assigning each of the plurality of UE devices into the respective UE group of the plurality of UE groups comprises randomly grouping the plurality of UE devices.

3. The method of claim 1, wherein reassigning the UE device from the respective UE group to an updated UE group comprises reassigning until a threshold number of iterations has been reached.

4. The method of claim 1, wherein a number of UE groups in the plurality of UE groups equals a number of pilot reference signals assigned to a base station communicating with the plurality of UE groups.

5. The method of claim 1, wherein generating the updated respective beamforming vector for each UE group of the plurality of UE groups comprises generating the updated respective beamforming vector that provides a largest minimum UE rate for that respective UE group.

6. The method of claim 1, wherein the UE rate comprises a UE download rate over a wireless channel between the UE device and a base station.

7. The method of claim 1, wherein the UE rate comprises a signal-to-noise ratio of a wireless channel between the UE device and a base station.

8. The method of claim 1, further comprising:
   generating the updated respective beamforming vector for each updated UE group that maximizes a sum rate or minimum UE rate for the updated UE group, wherein the sum rate comprises a summation of the UE rates of all UEs in the plurality of UE groups;
   reassigning the UE device from the respective UE group to the updated UE group based on the updated respective beamforming vector to maximize the sum rate or minimum UE rate for the updated UE group; and
   repeating the generating the updated respective beamforming vector and reassigning the UE device until a threshold number of iterations has been reached or the updated UE group converges.

9. The method of claim 8, further comprising:
   determining a gradient of the UE sum rate for the updated UE group; and
   normalizing the gradient of the UE sum rate.

10. The method of claim 1, further comprising:
    forming a plurality of UE grouping candidates from the updated UE groups;
    generating the updated respective beamforming vector for each updated UE group of each UE grouping candidate that maximizes a sum rate or the minimum UE rate for the updated UE group of each UE grouping candidate, wherein the sum rate comprises a summation of the UE rates of all UEs in the plurality of UE groups;
    determining the sum rate or the minimum UE rate for the UE groups of each UE grouping candidate;

finding a largest sum rate or minimum UE rate of the UE groups from the UE grouping candidates and corresponding updated beamforming vectors;

reassigning the UE device from the respective UE group to the updated UE group based on the updated respective beamforming vectors of the largest sum rate or minimum UE rate of the UE grouping candidate to maximize the sum rate or minimum UE rate for the updated UE group; and repeating the generating the updated respective beamforming vector and reassigning the UE device until a threshold number of iterations has been reached or the updated UE group converges.

11. The method of claim 10, wherein a UE grouping candidate of the plurality of UE grouping candidates is a perturbed UE group from the updated UE group.

12. The method of claim 11, wherein the perturbed UE group is obtained by moving one or more of the UE devices from their respective assigned updated UE group to another updated UE group based on the updated respective beamforming vector for the updated UE group.

13. The method of claim 10, wherein a UE grouping candidate of the plurality of UE grouping candidates is the updated UE group for each iteration.

14. A base station comprising:
a radio coupled to a plurality of antenna elements, wherein the radio is a multiple input multiple output (MIMO) radio; and
a controller, coupled to the radio and antenna elements, configured to assign each of a plurality of user equipment (UE) devices into a respective UE group of a plurality of UE groups, each UE group comprising at least one UE device, and reassign a UE device from the respective UE group to an updated UE group comprising at least two UE devices and generate an updated respective beamforming vector for the at least two UE devices of the updated UE group until the updated respective beamforming vector for the at least two UE devices of the updated UE group produces a largest average UE rate or the largest minimum UE rate.

15. The base station of claim 14, wherein the base station is an evolved Node B (eNodeB), an access point, a transmission node, a node in distributed antenna systems (DAS), a donor node controlling relay, a base transceiver station (BTS), or a multi-standard radio (MSR).

16. The base station of claim 14, wherein the controller is further configured to reassign the UE device and generate the updated respective beamforming vector over a plurality of iterations, wherein the respective UE group comprises a different group of UE devices for each iteration.

17. The base station of claim 16, wherein the controller is further configured to introduce a perturbation in the reassign of the UE device and update of the UE group, wherein the perturbation is based on a beamforming vector and UE group of a previous iteration.

18. The base station of claim 17, wherein the controller is further configured to determine the updated UE group and updated beamforming vector based on a maximized minimum UE rate for each UE group.

19. A non-transitory computer-readable storage medium that stores instructions for execution by processing circuitry of a base station to perform operations that:
assign each of a plurality of user equipment (UE) devices into a respective UE group of a plurality of UE groups, each UE group comprising at least one UE device; and
reassign UE devices from the plurality of assigned UE groups to multiple updated UE groups and generate an updated respective beamforming vector for each updated UE group of the multiple updated UE groups until the updated respective beamforming vector for each updated group produces a largest average UE rate or a largest minimum UE rate.

20. The non-transitory computer-readable storage medium of claim 19, wherein the updated respective beamforming vector for the updated UE group is used by the base station for communication over a wireless channel with each UE device in the updated UE group.

21. The non-transitory computer-readable storage medium of claim 19, wherein the operations further maximize a minimum UE rate for each updated UE group for each iteration of a plurality of iterations.

* * * * *